United States Patent Office 3,066,005
Patented Nov. 27, 1962

3,066,005
PROCESS FOR THE TREATMENT OF HYDROXYL GROUP-CONTAINING TEXTILE MATERIALS
Karlfried Wedemeyer, Koln-Stammheim, Karl Gustav Kleb, Leverkusen, Heinz Adolf Dortmann, Bergisch Gladbach, and Detlef Delfs, Opladen, Germany, assignors to Farbenfabriken Bayer Aktiengesellschaft, Leverkusen, Germany, a corporation of Germany
No Drawing. Filed Jan. 21, 1959, Ser. No. 788,049
Claims priority, application Germany Feb. 1, 1958
11 Claims. (Cl. 8—54.2)

The present invention relates to a process for the treatment of hydroxyl group-containing textile materials, particularly of fibres, fabrics and the like of native or regenerated cellulose, by applying to these materials in an aqueous medium organic compounds having one or more groups which can be alkylated together with polyfunctional compounds which contain as a functional grouping —OSO₃H or —OSO₃X groups, X being an alkali metal cation, haloalkyl groups and/or epoxide groups, capable of reacting with groups which can be alkylated, on the one hand, and with the hydroxyl groups of the materials to be treated, on the other hand, and by subjecting the material thus treated to the action of an elevated temperature in the presence of an acid-binding agent. The process enables textile materials to be produced particularly those which after treatment are fast to wetting.

The treatment of hydroxyl group-containing materials may have various purposes such as the dyeing of fibres or fabrics, change of the feel of fabrics, hydrophobing, application of optical bleaching agents, change of dyeing capability with substantive dyestuffs, or other changes of the properties of these materials. Depending on the type of intended treatment, the components on which the compounds with at least one group which can be alkylated to be used according to the invention are based may possess a widely varied composition. They may be dyestuffs, for example azo, azomethine, anthraquinone, triphenylmethane, oxazine or azoporphine dyestuffs. On the other hand, fluorescent compounds such as those of the stilbene, benzimidazole, benzoxazole or benzthiozole series may be used. In order to render textiles crease-resistant, the groups which can be alkylated may be present in high molecular weight compounds.

As groups which can be alkylated and of which at least one should be contained in the above mentioned classes of compounds there are to be understood for example: primary and secondary amino groups, sulphonic acid amide groups, sulphonic acid alkylamide groups, carboxylic acid amide and carboxylic acid alkylamide groups, hydroxyl groups and mercapto groups.

The components on which the polyfunctional compounds of the aforesaid type are based may also have a widely varied constitution. In addition to the aforesaid basic compounds of the dyestuff series, brightening agents, hydrophobing agents and crease-proofing agents, these compounds may also be colourless organic substances of any constitution, for example compounds of the benzene, diphenyl or naphthalene series. Polyfunctional compounds as defined by the present invention are derivatives which are capable of reacting, by means of their acid ester, haloalkyl or epoxide groups under the action of an elevated temperature in the presence of an acid-binding agent, with the aforesaid organic compound-containing groups which can be alkylated as well as with the hydroxyl groups of the material to be treated. Compounds of this type contain for example at least two groupings of the same or different type as follows:

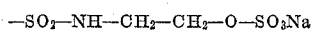

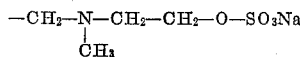
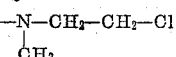
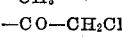
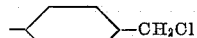
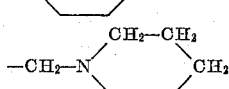
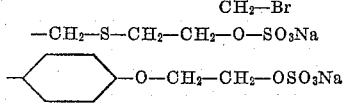
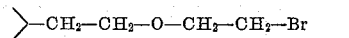
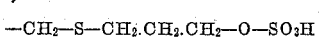
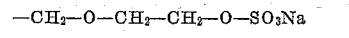
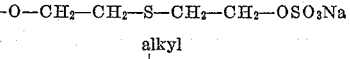
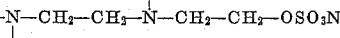
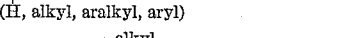
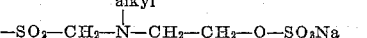
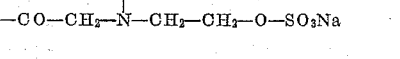
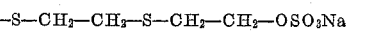
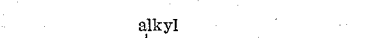
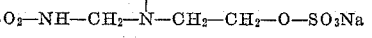
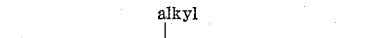
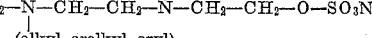
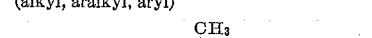
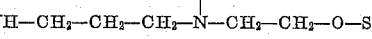

Bifunctional groups as exemplified by those listed below are required only once in the molecule, but they may also be present several times.

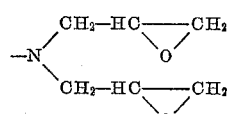
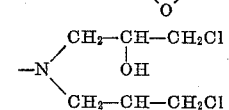
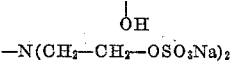

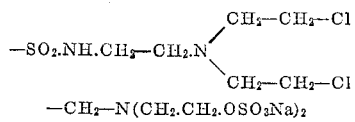

—CH$_2$—N(CH$_2$.CH$_2$.OSO$_3$Na)$_2$

The polyfunctional compound acts to a certain degree as a bridge member between the hydroxyl group-containing material and the groups which can be alkylated.

The compounds with a group which can be alkylated may also carry one or more mono- or polyfunctional groups. The addition of compounds with polyfunctional groups involves in this case an essentially higher yield in fixation on the fibre. Thus, a yellow dyestuff which contains a group which can be alkylated and a reactive group capable of reacting with the fibre, for example the dyestuff 1-aminobenzene - 4 - sulphonic acid-β-hydroxyalkyl - amide-sulphuric acid semiester→1 - (3' - aminophenyl)-3-methyl-5-pyrazolone, may for example be applied to the fibre together with a blue dyestuff which contains at least two monofunctional or one polyfunctional group, for example the reaction product from one mol of nickel-phthalocyanine-(3)-sic tetrasulphochloride and 4 mols of β-hydroxethylamino-sulphuric acid semiester, and fixed to give a green dyeing of very good fastness to wetting.

The application of mixtures of compounds containing groups which can be alkylated, with polyfunctional components of the specified type is preferably carried out in an aqueous solution which may be treated with an acid-binding agent such as alkaline substances, for example alkali metal hydroxide or alkali metal carbonate, or compounds convertible into alkaline substances such as alkali metal bicarbonate. Further auxiliaries may be added to the solution provided they do not react with the starting compounds in an undesired manner. Such additives are, for example, surface-active substances such as alkyl sulphates, or substances preventing the migration of the compounds applied, or other auxiliaries such as urea (for improving the solubility and fixation), or inert thickeners such as oil-in-water emulsions, tragacanth, starch, alginate or methyl cellulose.

The solutions or pastes are applied to the material to be treated, for example, by padding on the foulard or printing, and then heating to an elevated temperature, preferably to 40–160° C. for some time. The heating can be carried out in the hot flue, in a steaming apparatus, on heated rollers or by introducing the material into hot concentrated salt baths, either separately or also consecutively in any sequence.

When using a padding or dyeing liquor without an acid-binding agent, the dry material is subsequently passed through an alkaline solution to which sodium chloride or Glauber's salt has been added. The addition of salt diminishes the migration of the applied compounds from the fibre.

After fixation, the treated material is rinsed hot and, if required by the intended use of the material, finally soaped, insufficiently fixed residues of the applied compounds thus being removed. Fixations of dyestuffs, hydrophobing agents, optical brightening agents and the like are thus obtained which are excellently fast to wetting.

For the printing of hydroxyl group-containing materials there is used a printing paste consisting of a solution of the mixture to be applied, a thickener such as sodium alginate, and an acid-binding compound, i.e. a compound having an alkaline reaction or splitting off alkali on heating such as sodium carbonate, potassium carbonate or sodium bicarbonate, and the printed material is then rinsed and finally soaped, if desired.

A modification of the present process consists in that the starting components are not applied to the material as a mixture, but that the compound with a group which can be alkylated is applied first and that the material thus treated is then after-treated with a polyfunctional compound of the specified kind. A cotton fabric, may thus be impregnated, for example, with a solution of a dyestuff containing a group which can be alkylated, dried and then after-treated with an alkaline solution of a polyfunctional compound of the above mentioned type and, finally, fixed at an elevated temperature. This process may also be carried out without intermediate drying, if desired in the same bath.

Another modification of the process consists in treating the fabric first with a water-soluble polyfunctional compound of the specified type and then with a compound containing at least one group which can be alkylated, the action of the acid-binding agent being possible at various stages of the process. Water-soluble polyfunctional compounds are inter alia those containing sulphuric acid ester groups of the above mentioned type.

The treatment is expediently followed by a washing in a neutral or weakly alkaline aqueous bath. Amide group-containing materials such as wool, silk and the like may be treated in the same manner in a weakly acid to neutral medium.

If compounds with groups which can be alkylated or polyfunctional compounds of the specified type are used which have dyestuff character, those dyestuffs are especially advantageous for the dyeing process which possess no or only a slight affinity to the dyeing materials. The use of these dyestuffs enables a complete removal of the dyestuff molecules not firmly fixed to the fibre in the course of the dyeing process, to be completely removed by a final washing in a neutral or alkaline aqueous bath.

It is known to apply dyestuffs having reactive groups, for example those obtainable by condensation of amino group-containing azo and anthraquinone dyestuffs with cyanuric chloride, to hydroxyl group-containing fabrics, to after-treat the dyeings by heating in the presence of alkali, and to fix the dyestuffs according to this method to the fibre by a chemical reaction. Compared with such known processes, the process of the invention possesses a number of advantages. The range of application of the new process is essentially wider. In accordance with the type of fibre material to be treated or the intended purpose or available apparatus, the same compound containing groups which can be alkylated, may thus be fixed on the fibre with the polyfunctional compound of the specified type most suitable in each case. This implies not only a great variability of the intended and attainable treatment of the fabric, but also a great variety of fixing conditions, for example of the temperature or concentration of the acid-binding agent. Whilst with hitherto known methods, for example, every individual dyestuff must carry the reactive groups required for fixation and reacting with the fibre, the present process enables a whole range of dyestuffs or compounds of textile finishing to be fixed with a single polyfunctional reactive compound. Since these compounds with reactive groups are naturally very sensitive to various reagents and can be produced only by especially suitable methods and also with the observation of special instruction, the process according to the invention enables these compounds to be applied in an essentially more simple and also a considerably safer manner. In some cases, completely new ways of application are disclosed. Thus, for example, compounds containing groups which can be alkylated, may now be applied to the material to be treated under conditions which would exclude the presence of reactive groups capable of reacting with the fibre; the material may then be after-treated with the polyfunctional compound under optimum fixing conditions. This process is particularly suitable for the use of compounds of high molecular weight which are capable of penetrating into the fibre only at high temperatures.

The following examples are given for the purpose of illustrating the invention.

*Example 1*

2 g. of the dyestuff obtainable by coupling diazotized 3-aminobenzyl-methylamine with 1-(3'-sulphophenyl)-3-methylpyrazolone-(5) are dissolved in 100 ml. of water with the addition of 3.2 g. of sodium hydroxide, 0.3 g. of Turkey-red oil, 10 g. of urea and 28 g. of the reaction product from 1 mol of naphthalene-1,3,6-trisulphochloride and 3 mols of the sulphuric acid ester of β-hydroxyethylamine. The solution is padded onto calico and the impregnated fabric is heated to 140° C. for 10 minutes. The material is then rinsed and boiled with soap. A yellow dyeing is thus obtained which is very fast to wetting.

*Example 2*

A solution of 2 g. of the dyestuff used in Example 1 in 33 g. of water and 4 g. of sodium hydroxide solution (38° Bé.) is stirred, after the addition of 10 g. of urea and 8 g. of the reaction product from 1 mol of naphhtalene-1,3,6-trisulphochloride and 3 mols of the sulphuric acid ester of β-hydroxyethylamine, into 50 g. of alginate thickening containing 30 g. of dry substance per kilogram. Calico printed with this printing paste is dried at 80° C. and the print is developed within 10 minutes by subsequent heating to 140° C. After rinsing and boiling with soap, a yellow print of very good fastness to wetting is obtained.

*Example 3*

2 g. of the dyestuff obtainable by coupling diazotized 3-aminobenzyl-methylamine with 1-hydroxynaphthalene-4-sulphonic acid are dissolved in 100 ml. of water with the addittion of 3.2 g. of sodium hydroxide, 0.3 g. of Turkey-red oil, 10 g. of urea and 6 g. of the reaction product from 1 mol of naphthalene-1,3,6-trisulphochloride and 3 mols of the sulphuric acid ester of β-hydroxyethylamine. The solution is padded onto calico and the impregnated fabric is heated to 140° C. for 10 minutes. The fabric is then rinsed and boiled with soap. An orange dyeing is thus obtained which is very fast to wetting.

*Example 4*

A solution of 2 g. of the dyestuff used in Example 3 in 33 g. of water and 5 g. of sodium hydroxide solution (38° Bé.) is stirred, after the addition of 10 g. of urea and 6 g. of the reaction product from 1 mol of naphthalene-1,3,6-trisulphochloride and 3 mols of the sulphuric acid ester of β-hydroxyethylamine, into 50 g. of alginate thickening containing 30 g. of dry substance per kilogram. Calico printed with this printing paste is dried at 80° C. and the print is developed within 10 minutes by subsequent heating to 140° C. After rinsing and boiling with soap, an orange print of very good fastness to wetting is obtained.

*Example 5*

10 g. of stearylpropylenediamine-(1,3) are dissolved in 100 ml. of water with addition of 10 ml. of glacial acetic acid and a cotton fabric is impregnated with this solution. After drying at 100° C., the fabric is dipped into a solution of 100 g. of the reaction product from 1 mol of naphthalene-1,3,6-trisulphochloride and 3 mols of the sulphuric acid ester of β-hydroxyethylamine in 100 ml. of water with the addition of 20 ml. of sodium hydroxide solution (38° Bé.) and 10 g. of urea, squeezed off and heated to 140° C. for 10 minutes. After rinsing and boiling with soap, a hydrophobed fabric of good fastness to wetting is obtained.

A hydrophobed fabric which is likewise distinguished by very good fastness to wetting can be obtained if as polyfunctional fixing component the reaction product of 1 mol of naphthalene-1,3,6-trisulphochloride and 3 mols of the sulphuric acid ester of N-3-aminobenzyl-N-β-hydroxyethyl-N-methylamine, or the reaction product of 1 mol of naphthalene-1,3,6-trisulphochloride and 3 mols of the sulphuric acid ester of N-methyl-N-β-hydroxyethyl-propylenediamine-(1,3) is used.

The stearyl propylenediamine-(1,3) can be replaced with the same or equal results by other long chain aliphatic amines such as stearyl amine or N-methyl stearyl amine.

*Example 6*

2 g. of the dyestuff used in Example 1 are dissolved in 100 ml. of water with the addition of 3.2 g. of sodium hydroxide, 0.3 g. of Turkey-red oil, 10 g. of urea and 6 g. of the reaction product from 1 mol of 1,5-diaminonaphthalene-3,7-disulphonic acid and 4 mols of epichlorhydrin which is subsequently converted into the tetraepoxide. The solution is padded onto calico and the impregnated fabric heated to 140° C. for 10 minutes. The fabric is then rinsed and boiled with soap. A yellow dyeing is thus obtained which is very fast to wetting.

*Example 7*

2 g. of the dyestuff used in Example 3 are dissolved in 100 ml. of water with the addition of 3.2 g. of sodium hydroxide, 0.3 g. of Turkey-red oil, 10 g. of urea and 6 g. of the reaction product from 1,5-diaminonaphthalene-3,7-disulphonic acid and epichlorhydrin used in Example 6. The solution is padded onto calico and the impregnated fabric is heated to 140° C. for 10 minutes. The fabric is then rinsed and boiled with soap. An orange dyeing is thus obtained which is very fast to wetting.

*Example 8*

0.4 g. of a dyestuff mixture containing (a) The potassium salt of nickel-phthalocyanine-(3)-tetra-(sulphonyl-amino-β-hydroxyethyl-sulphuric acid ester) and (b) The monoazo dyestuff from diazotized 1-amino-2-methoxy-benzene-4-(sulphonyl-amino-β-hydroxyethyl-sulphuric acid ester) and 1-(4'-aminophenyl)-3-methyl-pyrazolone-(5)

in molar proportions, is dissolved in 10 ml. of a fixing solution containing per litre 100 g. of urea, 25 ml. of conc. sodium hydroxide and 5 ml. of Turkey-red oil, and the dyeing material is padded with this solution. After a heat treatment at 120° C. in a drying oven for about 10 minutes, subsequent washing and boiling with soap, a clear deep green dyeing in high fixing yield is obtained which is fast to washing, boiling solvents and to light.

With 0.4 g. of a dyestuff mixture containing the above mentioned components (a) and (b) in a molar ratio of 1:2, there is obtained by the process of this example a dyeing having the same good yield and fastness properties, but a more yellowish shade, and with 0.4 g. of a dyestuff mixture containing the components (a) and (b) in a molar ratio of 1:3 a still more yellowish dyeing.

*Example 9*

0.4 g. of a dyestuff mixture containing (a) The potassium salt of nickel-phthalocyanine-(3)-tetra-(sulphonylamino-β-hydroxyethyl-sulphuric acid ester) and (b) The monoazo dyestuff from diazotized 1-amino-2-methoxy-benzene-4-(sulphonylamino-β-hydroxyethyl-sulphuric acid ester) and 1-(3'-aminophenyl)-3-methyl-pyrazolone-(5)

in molar proportions, is padded onto cotton or regenerated cellulose and treated according to the instructions of Example 8. A dyeing is thus obtained which is fast to washing, boiling, solvents and to light. The shade of the dyeing is a clear deep green. If the proportions of the components (a) and (b) are varied according to Example 8, more yellowish dyeings are likewise obtained.

*Example 10*

4.0 g. of a dyestuff mixture containing (a) The potassium salt of nickel-phthalocyanine-(3)-tetra-(sulphonyl-amino-β-hydroxyethyl-sulphuric acid ester) and (b) The monoazo dyestuff from diazotized 1-amino-4-methyl-benzene-5-(sulphonylamino-β-hydroxyethyl-sulphuric acid ester) and 1-(4'-aminophenyl)-3-methyl-pyrazolone-(5)

in molar proportions, is applied to a fabric and treated as described in Example 8. A clear green dyeing is thus obtained which is fast to washing, boiling, solvents and to light. If the proportions of the components (a) and (b) are varied similarly to the instructions of Example 8, more yellowish shades are obtained.

If the monoazo dyestuff, obtainable by coupling with 1-(3'-aminophenyl)-3-methyl-pyrazolone-(5) is used as component (b), clear green dyeings are likewise obtained which are fast to washing, boiling, solvents and to light.

By varying thereby the proportions of the components (a) and (b) similarly to Example 8, more greenish dyeings are likewise obtained.

*Example 11*

0.4 g. of a dyestuff mixture containing (a) The potassium salt of nickel-phthalocyanine-(3)-tetra - (sulphonylamino - β - hydroxyethyl - sulphuric acid ester) and (b) The copper complex of the monoazo dyestuff from diazotized 1 - amino - 2-hydroxy-3-chlorobenzene-5-(sulphonylamino - β - hydroxyethyl - sulphuric acid ester) and 1-(4'-aminophenyl)-3-methyl-pyrazolone-(5)

in molar proportions, is applied to a fabric and treated as described in Example 8. A dull green dyeing is thus obtained which are fast to washing, boiling, solvents and to light.

By starting from the coppered monoazo dyestuff from the same diazo components and 1-(3'-aminophenyl)-3-methyl-pyrazolone-(5), dull green dyeings are likewise obtained which are fast to washing, boiling, solvents and to light.

In a similar manner mixtures from the components (a) and (b) are listed in the following table yield on fabrics of cotton or regenerated cellulose, dyeings in the indicated shades which are very fast to wetting.

| | Components | | ratio | shade |
|---|---|---|---|---|
| | (a) | (b) | | |
| (12) | nickel-phthalocyanine-(3)-tetra-(sulphonyl-amino-β-hydroxyethyl-sulphuric acid ester), potassium salt. | 1-amino-2-carboxy-benzene-5-sulphonyl-amino-β-hydroxyethyl-sulphuric acid ester) → 1-(4'-amino-phenyl)-3-methyl-pyrazolone-(5), copper complex. | 1:1 | dull green. |
| (13) | do | 1-amino-2-carboxy-benzene-5-(sulphonyl-amino-β-hydroxyethyl-sulphuric acid ester) →1-(3'-amino-phenyl)-3-methyl-pyrazolone-(5), copper complex. | 1:1 | Do. |
| (14) | do | 1-aminobenzene-3-(sulphonylamino-β-hydroxyethyl-sulphuric acid ester)→1-(4'-aminophenyl)-3-methyl-pyrazolone-(5). | 1:1 | deep green. |
| (15) | do | 1-aminobenzene-3-(sulphonylamino-β-hydroxyethyl-sulphuric acid ester)→1-(3'-aminophenyl)-3-methyl-pyrazolone-(5). | 1:1 | Do. |
| (16) | do | 1-amino-2-chloro-benzene-5-(sulphonyl-amino-β-hydroxyethyl-sulphuric acid ester)→1-(4'-amino-phenyl)-3-methyl-pyrazolone-(5). | 1:1 | green. |
| (17) | do | 1-amino-2-chloro-benzene-5-(sulphonyl-amino-β-hydroxyethyl-sulphuric acid ester) →1-(3'-amino-phenyl)-3-methyl-pyrazolone-(5). | 1:1 | Do. |
| (18) | nickel-phthalocyanine-(3)-tetra-(sulphonyl-amino-β-hydroxy-ethyl-sulphuric acid ester), potassium salt. | 1-amino-3,4-dichlorobenzene-6-(sulphonyl-amino-β-hydroxyethyl-sulphuric acid ester)→1-(4'-amino-phenyl)-3-methyl-pyrazolone-(5). | 1:1 | green |
| (19) | nickel-phthalocyanine-(3)-tetra-(sulphonyl-β-hydroxyethyl)-sulphuric acid ester), potassium salt. | 1-amino-3,4-dichloro-benzene-6-(sulphonyl-amino-β-hydroxyethyl-sulphuric acid ester) →1-(3'-amino-phenyl)-3-methyl-pyrazolone-(5). | 1:1 | Do. |
| (20) | nickel-phthalocyanine-(3)-tetra-(sulphonyl-amino-β-hydroxy-ethyl-sulphuric acid ester), potassium salt. | 1-amino-3-chloro-4-methylbenzene-6-(sulphonyl-amino-β-hydroxyethyl-sulphuric acid ester)→1-(4'-amino-phenyl)-3-methyl-pyrazolone-(5). | 1:1 | Do. |
| (21) | do | 1-amino-3-chloro-4-methylbenzene-6-(sulphonyl-amino-β-hydroxyethyl,sulphuric-acid ester) →1-(3'-amino-phenyl)-3-methyl-pyrazolone-(5). | 1:1 | Do. |
| (22) | do | 1-amino-3,5-dichloro-benzene-4-(sulphonylamino-β-hydroxyethyl-sulphuric acid ester)→1(4'-amino-phenyl)-3-methyl-pyrazolone-(5). | 1:1 | Do. |
| (23) | do | 1-amino-3-nitrobenzene-4-(sulphonyl-amino-β-hydroxy-ethyl-sulphuric acid ester)→1-(4'-amino-phenyl)-3-methyl-pyrazolone-(5). | 1:1 | Do. |
| (24) | do | 1-amino-2,4-dimethylbenzene-6-(sulphonyl-amino-β-hydroxy-ethyl-sulphuric acid ester) →1-(4'-amino-phenyl)-3-methyl-pyrazolone-(5). | 1:1 | Do. |

It is, of course, also possible to choose other proportions of the components (a) and (b) than those indicated in Examples 8–24. If in these examples instead of the nickel-phthalocyanine derivatives there is used copper-phthalocyanine - (3) - tetra-(sulphonyl-amino-β-hydroxyethyl-sulphuric acid ester) as component (a) green dyeings are obtained from all combinations which have a good fastness to boiling, washing and solvents, but are, in general, a little less fast to light.

*Example 25*

0.4 g. of a dyestuff mixture containing (a) The potassium salt of nickel-phthalocyanine-(3)-tetra-(sulphonyl - amino - β - hydroxyethyl-sulphuric acid ester) and (b) The copper complex of the monoazo dyestuff from diazotized 1-amino - 2 - hydroxy-3-chlorobenzene-5-(sulphonyl - amino - β - hydroxyethyl-sulphuric acid ester) and 1-carboxy - 2 - hydroxynaphthalene-6-(sulphonyl-aminoethylamine)

in the molar proportions 1:1, 1:2 or 1:3, is applied to a fabric and treated according to the instructions of Example 8. Blue dyeing are thus obtained which are fast to boiling, washing and solvents and the reddish tinge of which increases with increasing content of the corresponding monoazo dyestuff. It is also possible to use other proportions than those indicated.

If instead of the nickel-phthalocyanine derivative there is used the potassium salt of copper-phthalocyanine-(3)-tetra-(sulphonyl - amino - β - hydroxyethyl-sulphuric acid ester) as component (a), blue dyeings are likewise obtained which are fast to boiling, washing and solvents and the reddish tinge of which increases with increasing content of the corresponding monoazo dyestuff.

Example 26

0.4 g. of a dyestuff mixture containing (a) Nickel-phthalocyanine - (3) - tetra-(sulphonylamino-β-hydroxyethyl-sulphuric acid ester) potassium salt,
(b) The monoazo dyestuff from diazotized 1-amino-2-methoxybenzene - 4 - (sulphonylamino - β - hydroxyethyl-sulphuric acid ester) and 1-(4'-aminophenyl)-3-methylpyrazolone-(5), and
(c) The copper complex of the monoazo dyestuff from diazotized 1-amino-2-hydroxy - 3 - chlorobenzene-5-(sulphonylamino - β - hydroxyethyl - sulphuric acid ester) and 1 - carboxy - 2 - hydroxynaphthalene-6-β-aminoethylsulphonamide in the molar proportions 1:1:1, 1:1:2 or 1:2:1, is applied to a fabric and treated according to the instructions of Example 8. Dyeings in olive-green, black-brown or olive-green shades are thus obtained which are fast to washing, boiling and solvents. When using the potassium salt of copper-phthalocyanine - (3) - tetra-(sulphonylamino-β-hydroxyethyl-sulphuric acid ester) as component (a), dyeings in similar shades are obtained which are likewise fast to washing, boiling and solvents.

Example 27

2 g. of the dyestuff obtainable by coupling diazotized 4 - aminobenzylamine with 1 - hydroxynaphthalene-4-sulphonic acid are dissolved in 100 ml. of water with the addition of 2.1 g. of sodium hydroxide, 0.3 g. of Turkey-red oil, 10 g. of urea and 6 g. of the reaction product from 1 mol of naphthalene-1,3,6-trisulphochloride and 3 mols of the sulphuric acid semiester of N-3-aminobenzyl-N-methyl-β-hydroxyethylamine.

The solution is padded onto calico and the impregnated fabric is heated to 140° C. for 10 minutes. The fabric is then rinsed and boiled with soap. A red dyeing is thus obtained very fast to wetting.

If in this example there is used as a polyfunctional compound 6 g. of the reaction product from 1 mol of naphthalene-1,3,6-trisulphochloride and 3 mols of the sulphuric acid semiester of β-hydroxyethylpiperazine or N-β-hydroxyethyl - N - methyl-propylenediamine-(1,3), red dyeings fast to wetting are likewise obtained.

Example 28

1 g. of the dyestuff obtainable by chlorination of the reaction product from 1 mol of copper-phthalocyanine-(3)-trisulphochloride and 3 mol of N-β-hydroxyethyl-N-methyl-propylenediamine-(1,3) with thionyl chloride and corresponding to the formula:

copper—phthalocyanine—(3)—(SO₂—NH—CH₂—CH₂—CH₂

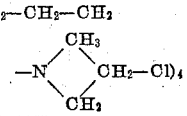

is dissolved as a hydrochloride in 200 ml. of water. Into this solution there is stirred a solution of the dyestuff obtainable by coupling diazotized 3-aminobenzyl-β-hydroxyethylamine with 1-phenyl-3-methyl-pyrazolone-(5) and dissolved as a hydrochloride in 60 ml. of water.

The green dyestuff solution thus obtained is padded onto calico, well squeezed off and the impregnated fabric is dipped into an aqueous solution containing per litre 40 g. of sodium hydroxide and 50 g. of urea. After renewed squeezing, the fabric is heated to 140° C. for 10 minutes and then rinsed and boiled with soap. A turquoise dyeing is thus obtained very fast to wetting.

Similar dyeings fast to wetting are obtainable by using as an acid-binding agent, instead of sodium hydroxide, potassium carbonate, sodium carbonate, potassium-hydrogen carbonate, sodium hydrogen carbonate, trisodium phosphate, sodium silicate, sodium acetate or potassium hydroxide.

Similar fixation of the dyeing is obtained when the fabric treated with the acid binding agent is stored at 40° C. for one hour or at higher temperatures for a shorter period of time.

Example 29

A cotton fabric is impregnated with an aqueous solution containing 3% of sodium hydroxide and 1% of an alginate thickening, squeezed off and dried. The fabric thus treated is then printed with a printing paste consisting of 2 g. of the dyestuff mentioned in Example 1
8 g. of the polyfunctional compound mentioned in Example 1
10 g. of urea
25 g. of water and
60 g. of alginate thickening.

The printed fabric is dried at 80° C. and then heated to 140° C. for 10 minutes. It is then rinsed and boiled with soap. A yellow print is thus obtained which is very fast to wetting.

Example 30

Calico is dyed in usual manner with the dyestuff obtainable by coupling 2 mols of diazotised 3-aminobenzylmethylamine with 1 mol of N,N'-di-(5'-hydroxy-7'-sulphonaphthyl-[2'])-urea, with the addition of sodium carbonate and sodium sulphate, then rinsed and dried. The dyed material is then impregnated with an aqueous solution containing per litre 60 g. of the reaction product from 1 mol of naphthalene-1,3,6-trisulphochloride and 3 mol of the sulphuric acid semiester of β-hydroxyethylamine, 50 g. of urea and 20 g. of sodium hydroxide. It is squeezed off and heated to 140° C. for 10 minutes. The fabric is then rinsed and boiled with soap. A brick-red dyeing is thus obtained which is very fast to wetting.

Example 31

Calico is impregnated with a 10% aqueous solution of the reaction product from 1 mol of naphthalene-1,3,6-trisulphochloride and 3 mol of the sulphuric acid semiester of β-hydroxyethylamine, well squeezed off and dried at 80° C. Onto the fabric thus treated there is padded a solution of 20 g. of the dyestuff obtainable by coupling diazotized 4-aminobenzylamine with 1-naphthol-4-sulphonic acid, 200 g. of urea, 2 g. of Turkey-red oil and 21 g. of sodium hydroxide in 1 litre of water, and the fabric is heated to 140° C. for 10 minutes. It is then rinsed and boiled with soap. A red dyeing is thus obtained which is very fast to wetting.

Example 32

Calico is treated with an aqueous solution containing per litre 60 g. of urea, 60 g. of potassium carbonate and 60 g. of the polyfunctional compound used in Example 31. The fabric is squeezed off and dried at 80° C. The fabric is then treated with an aqueous dyestuff solution containing per litre 10 g. of the dyestuff used in Example 31, 60 g. of urea and 3 g. of Turkey-red oil. The fabric is squeezed off and then heated to 140° C. for 10 minutes. It is then rinsed and boiled with soap. A red dyeing is thus obtained which is very fast to wetting.

Example 33

0.6 g. of a dyestuff mixture containing (a) 0.2 g. of the potassium salt of copper-phthalocyanine-(3)-tris-[sulphonylamino - λ - n - propyl-amino-(N',N'-bis-β-hydroxyethyl sulphuric acid ester)] and (b) 0.4 g. of the monoazo dyestuff obtainable by coupling diazotized 1-aminobenzene - 4 - sulphonic acid with 1-(4'-aminophenyl)-3-methyl-pyrazolone-(5)

is applied to a fabric and treated as described in Example 8. A green dyeing is thus obtained which is fast to washing, boiling and solvents.

In a similar manner mixtures of the components (a) and (b) listed in the following table yield on fabrics of native or regenerated cellulose, dyeings in the indicated shades which are very fast to wetting.

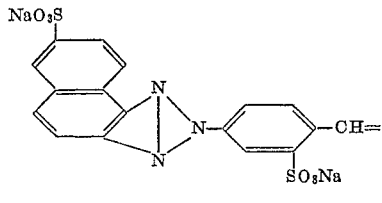

|   | Components | | Proportions in grams | Shade |
|---|---|---|---|---|
|   | (a) | (b), azo dyestuff | | |
| (34) | copper phthalocyanine-(3)-tris-[sulphonyl-amino-γ-n-propylamino-(-N'-methyl-N'-β-hydroxethyl sulphuric acid-ester)], potassium salt. | 1-aminobenzene-4-sulphonic acid→ — 1-(4'-aminophenyl)-3-methyl-pyrazolone-(5). | 0.2:0.4 | bluish-green. |
| (35) | copper phthalocyanine-(4)-tris-[sulphonyl-amino-γ-n-propylamino-(N',N'-bis-β-hydroxethyl-sulphuric acid ester)], potassium salt. | do | 0.2:0.4 | dull green. |
| (36) | copper phthalocyanine-(4)-tris-[sulphonyl-amino-γ-n-propylamino-(N'-methyl-N'-N'-β-hydroxethyl sulphuric acid ester)] potassium salt. | do | 0.2:0.4 | bluish green. |
| (37) | nickel phthalocyanine-(3)-tris-[sulphonyl-amino-γ-n-propylamino-(N',N'-bis-β-hydroxethyl-sulphuric acid ester)], potassium salt. | do | 0.2:0.4 | yellowish green. |
| (38) | nickel phthalocyanine-(3)-tris-[sulphonyl-amino-γ-n-propylamino (N'-methyl-N'-hydroxethyl-sulphuric acid ester)], potassium salt. | do | 0.2:0.4 | green. |

*Example 39*

A cotton fabric is dyed in usual manner with an optical bleaching agent of the formula

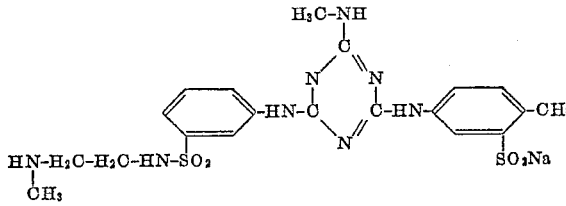

with the addition of soda and sodium sulphate, rinsed and dried. The material thus treated is impregnated with an aqueous solution containing per litre 60 g. of the reaction product from 1 mol of naphthalene-1,3,6-trisulphochloride and 3 mols of the sulphuric acid ester of β-hydroxy-ethylamine, 50 g. of urea and 20 g. of sodium hydroxide. The fabric is squeezed off, heated to 140° C. for 5 minutes and subsequently rinsed and soaped at the boil. One obtains a brightened fabric having very good fastness to wetting.

In the same manner the following brightening agent can be fixed on cotton and regenerated cellulose:

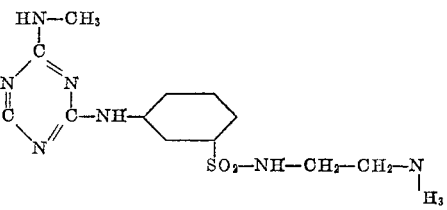

As polyfunctional fixing component there can be used with similar result the reaction product from 1 mol of naphthalene-1,3,6-trisulphochloride and 3 mols of the sulphuric acid ester of N-3-aminobenzyl-N-β-hydroxy-ethyl-N-methylamine.

We claim:

1. Process for the treatment of cellulose-containing textile materials which comprises applying to these materials in an aqueous medium (a) at least one water-soluble amino-group-containing dyestuff with at least one replaceable hydrogen atom at the amino group and (b) at least one compound selected from the class consisting of a water-soluble colored compound and a water-soluble colorless compound, said compound containing at least two substituents selected from the group consisting of hydroxy alkyl sulfonamide sulfuric acid semi-ester, hydroxy alkyl sulfone sulfuric acid semiester and hydroxy alkylamino sulfuric acid semiester, the alkyl group having 2 to 3 carbon atoms, and (a) and (b) being of different structure; subjecting the material thus treated to the action of a temperature of from 40° C. to 160° C. in the presence of an acid binding agent and thus causing chemical linkage to component (a) via component (b) to cellulose.

2. The process of claim 1 wherein (b) is a water-soluble colorless compound containing at least two hydroxy alkyl sulfonamide sulfuric acid semiester groups, the alkyl grouping having 2 to 3 carbon atoms.

3. The process of claim 1 wherein (b) is a water-soluble color compound containing at least two hydroxy alkyl sulfonamide sulfuric acid semiester groups, the alkyl grouping having 2 to 3 carbon atoms.

4. Process according to claim 1 which comprises following up the heat treatment step with treatment in a neutral to alkaline bath.

5. Process according to claim 1 wherein the material is first treated with an aqueous solution of the component (a), then subsequently treated with an aqueous solution of the component (b) and then subjected to the heat treatment step.

6. Process according to claim 1 wherein the material is first treated with an aqueous solution of component

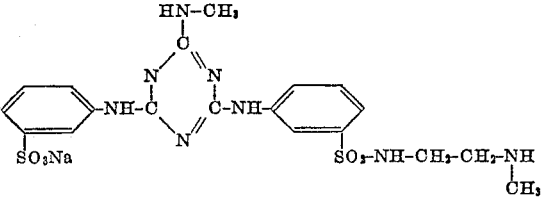

(b) then subsequently treated with an aqueous solution of the component (a) and then subjected to the heat treatment step.

7. Process according to claim 1 wherein the component (a) and the component (b) are simultaneously applied.

8. Cellulose-containing textile materials treated according to the process of claim 1.

9. Cellulose-containing textile materials treated according to the process of claim 5.

10. Cellulose-containing textile materials treated according to the process of claim 6.

11. Cellulose-containing textile materials treated according to the process of claim 7.

References Cited in the file of this patent

UNITED STATES PATENTS

| | | |
|---|---|---|
| 1,741,637 | Lilienfeld | Dec. 31, 1929 |
| 1,886,480 | Haller et al. | Nov. 8, 1932 |
| 2,670,265 | Heyna et al. | Feb. 23, 1954 |
| 2,678,330 | Gorder et al. | May 11, 1954 |
| 2,741,532 | Guthrie | Apr. 10, 1956 |
| 2,774,691 | Schroeder et al. | Dec. 18, 1956 |

FOREIGN PATENTS

| | | |
|---|---|---|
| 696,282 | Great Britain | Aug. 26, 1953 |

OTHER REFERENCES

Broden et al.: Amer. Dyestuff Reporter, January 4, 1954, pages P6–P13.